(12) United States Patent
Limpert et al.

(10) Patent No.: US 7,862,274 B2
(45) Date of Patent: Jan. 4, 2011

(54) FASTENER TO AFFIX A COMPONENT TO A SUPPORT WITH APERTURE

(75) Inventors: Alexander Limpert, Salz (DE); Udo Henkelmann, Roettingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 376 days.

(21) Appl. No.: 11/916,854

(22) PCT Filed: Jun. 8, 2006

(86) PCT No.: PCT/IB2006/001537

§ 371 (c)(1),
(2), (4) Date: Dec. 7, 2007

(87) PCT Pub. No.: WO2006/131823

PCT Pub. Date: Dec. 14, 2006

(65) Prior Publication Data

US 2008/0199272 A1    Aug. 21, 2008

(30) Foreign Application Priority Data

Jun. 9, 2005    (DE)    ........................ 10 2005 026 478

(51) Int. Cl.
F16B 13/06    (2006.01)
(52) U.S. Cl. .......................................... 411/45; 24/297
(58) Field of Classification Search ................... 411/41, 411/45–48; 24/297, 453
See application file for complete search history.

(56) References Cited

U.S. PATENT DOCUMENTS 3,099,931 A * 8/1963 Ferdinand .................... 411/15
4,176,428 A   12/1979 Kimura
4,648,766 A * 3/1987 Wollar .......................... 411/41
4,668,145 A * 5/1987 Hirohata ...................... 411/508

(Continued)

OTHER PUBLICATIONS

ISR for PCT/IB2006/001537 mailed Oct. 4, 2006.

*Primary Examiner*—Flemming Saether
(74) *Attorney, Agent, or Firm*—Lowe Hauptman Ham & Berner LLP

(57) ABSTRACT

A fastener to affix a component in a support fitted with an aperture, comprising an affixation casing of resilient plastic, further a hollow conical shell, and at one end a radial flange that cooperates in sealing manner with the support surface facing it when the affixation casing has been mounted in said aperture, the casing being fitted peripherally with radial bosses, ribs or the like that engage from below the aperture rim when the affixation casing, being temporarily deformed radially at its bosses, ribs or the like is being inserted into said aperture, further comprising a plastic core which is fitted with a head and which can be inserted from the affixation casing's flanged end into the core cavity and which radially expands the casing and prevents it from being removable from the aperture, characterized by at least one radially inwardly pointing boss on the wall of the casing cavity and by the core being fitted at its end with a preferably peripheral groove that is entered by said boss when the core is pressed into the conical shell of the affixation casing and by the core being fitted on the side of the clearance facing the of the core with a shoulder or a shoulder engaging under the boss when the core has been fully inserted into the conical shell.

5 Claims, 2 Drawing Sheets

U.S. PATENT DOCUMENTS

| | | |
|---|---|---|
| 4,716,633 A | 1/1988 | Rizo et al. |
| 5,217,337 A * | 6/1993 | Junemann et al. ............. 411/45 |
| 5,775,860 A | 7/1998 | Meyer et al. |
| 7,033,121 B2 * | 4/2006 | Kirchen ....................... 411/48 |
| 2004/0151560 A1 | 8/2004 | Kirchen |

* cited by examiner

FASTENER TO AFFIX A COMPONENT TO A SUPPORT WITH APERTURE

RELATED APPLICATIONS

The present application is based on International Application Number PCT/IB2006/001537 filed Jun. 8, 2006, and claims priority from German Application Number 10 2005 026 478.6 filed Jun. 9, 2005, the disclosures of which are hereby incorporated by

TECHNICAL FIELD

The present invention relates to a fastener to affix a component to a support with an aperture.

BACKGROUND

A large number of different plastic fasteners have become known to affix components for instance to automobile body parts. Illustratively expanding plastic rivets comprising resilient legs are known that will be driven apart using a plastic mandril to affix said rivet in the aperture of the automobile body component. Also so-called expansive or percussion nuts have become popular that are deposited on projecting bolts welded onto automobile body parts. The projection bolts are fitted with a thread or annular grooves. Similarly so-called grommets have become known: mostly they comprise a cylindrical casing made of resilient plastic and insertable into a aperture and fitted externally with one or more shoulders or offsets gripping a aperture rim from below. A core or plug is inserted into the hollow grommet shank and prevents pulling it out of the aperture. Such a fastener comprises a radial flange resting against the facing surface of the support component and sealing this site. The grommet is fitted with a cavity which is closed toward the other end and which receives the fastener plug. In this manner, such a fastener provides affixing in sealing manner a component to a support. Moreover, this design offers acoustic damping.

SUMMARY

The objective of the present invention is to create of fastener as cited immediately above wherein the plug is pre-installed in a fastener case while at the same time the fastener casing can be assembled into the said support aperture while the plug is pre-mounted.

As regards the fastener of the present invention, at least one inward pointing boss is configured on the inside wall of the shank cavity. Said plug is fitted near its end with a preferably peripheral clearance that shall be entered by said boss when the plug is forced into the cavity to assume its premounted position. The plug furthermore is fitted with a recess or constriction or a shoulder on the recess side facing the plug head to engage underneath the cavity boss when this point has been fully shank or cavity.

In one embodiment mode of the present invention, said boss ins an annular rib. This rib may exhibit an appropriate cross-section. Preferably it shall be cross-sectionally trapezoidal. Preferably the annular groove or clearance at the in shall be complementary to the annular rib.

In another embodiment mode of the present invention, the plug comprises near its head a cylindrical segment cooperating with the cylindrical cavity segment when the plug is fully forced into the shank. In the pre-assembled state, the point's cylindrical segment is situated outside the cavity. Preferably the diameter of the cylindrical plug segment is slightly larger than the cylindrical shank segment. As a result and the plug has been fully inserted, the fastener casing shank is slightly widened radially and the associated outer wall of the fastener engages in sealing manner the aperture/aperture wall. Moreover, the fastener thereby is prevented from being disengaged from the support component aperture in the event traction should be exerted on the plug, or on the said fastener casing.

As regards a further embodiment of the present invention, the fastener casing and the plug are designed in a manner that the force required to insert the fastener casing together with the premounted plug into the said aperture shall be less than the full force needed to complete press the plug into the casing. In this manner applying pressure to the plug allows easily assembling without further exertion the fastener casing into the support aperture, the plug remaining in its pre-mounted configuration. Thereupon the plug can forced by application of a larger pressure into the fastener casing.

The fastener of the present invention offers the age that the force required to press and assemble the fastening casing into the aperture can be low. Plug fracture is nearly excluded. Moreover there is no danger anymore that material shall be scraped off externally at the rib bosses or the like when the fastener casing is assembled into the support's aperture.

BRIEF DESCRIPTION OF THE DRAWINGS

The invention is elucidated below in relation to an embodiment illustrated in the appended drawings.

DETAILED DESCRIPTION OF THE PREFERRED EMBODIMENTS

Figure 1:
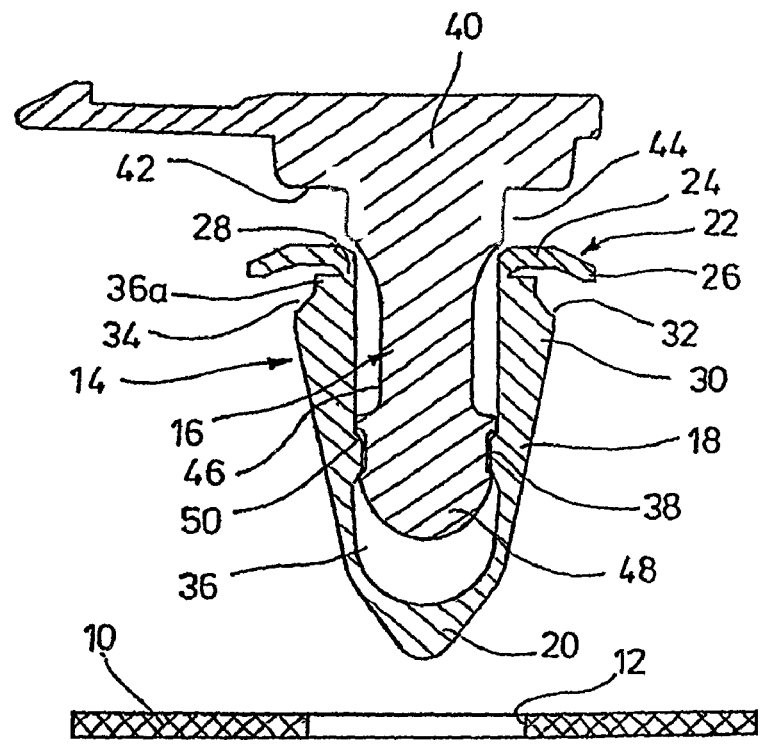
FIG. 1 shows a fastener a fastener structure of the invention comprising a pre-mounted plug before being inserted into a support.
Figure 2:
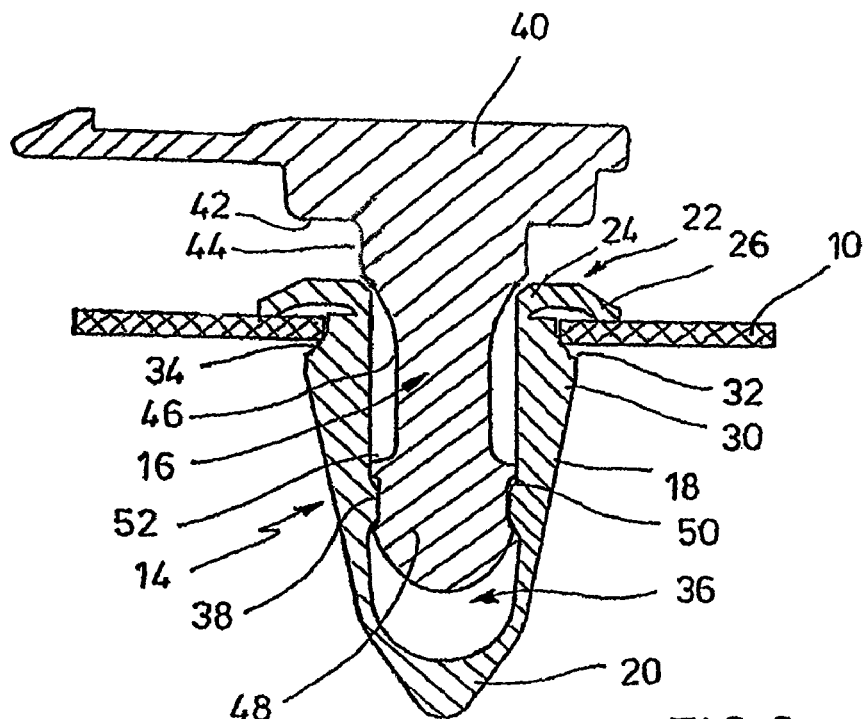
FIG. 2 shows the assembly of FIG. 1 following assembly into a support.
Figure 3:
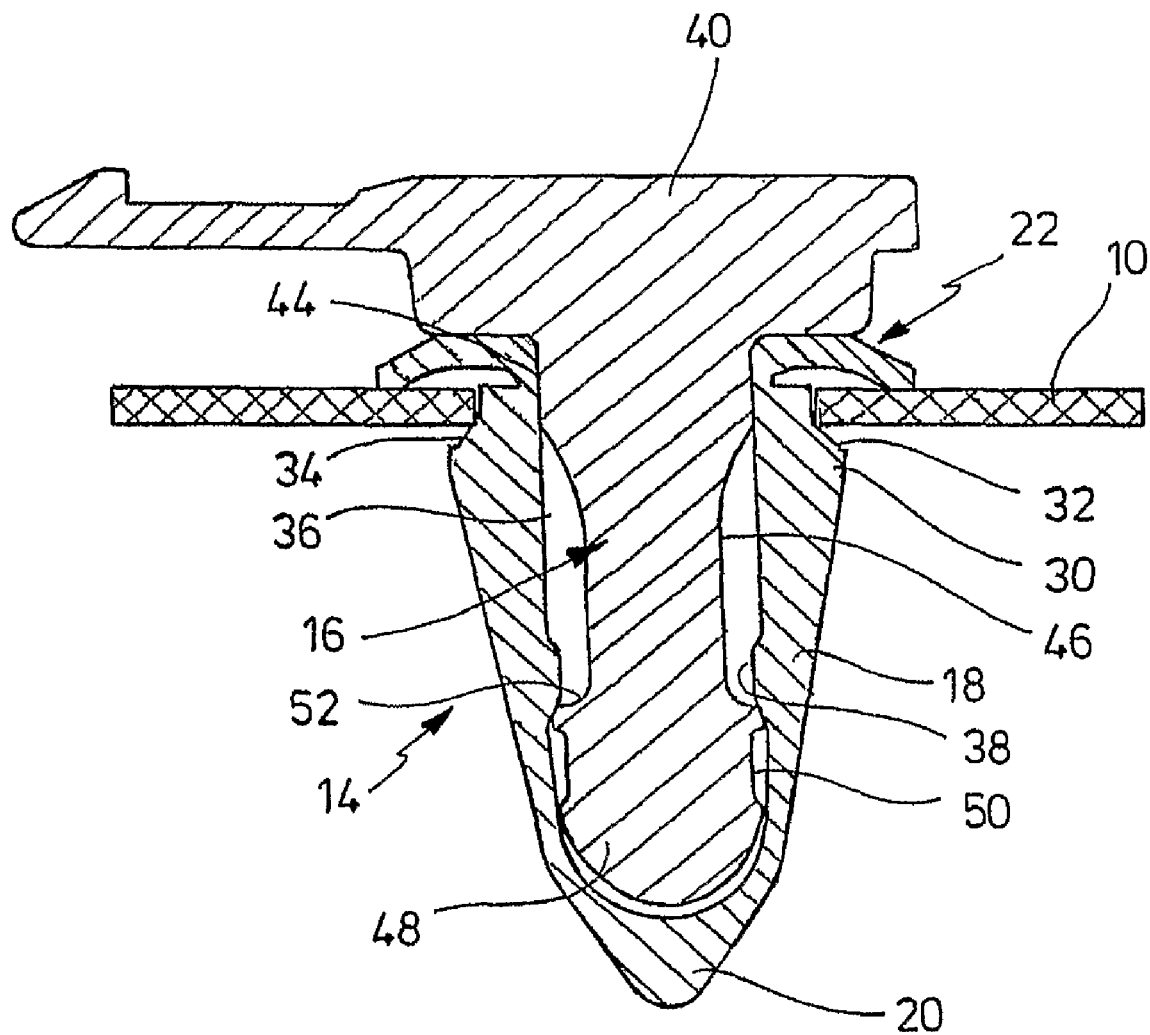
FIG. 3 shows the configuration of the fastener of the invention of FIGS. 1 and 2 after the plug has been fully inserted.

FIGS. 1 through 3 show a support 10 fitted with an aperture 12. They also show fixation casing 14 and a plug 16. Both parts 14, 16 are molded from an appropriate plastic, the affixation casing 14 being made of a resilient plastic. The separately manufactured plug 14 may be made of a harder material.

The affixation casing 14 comprises a shell or hollow shank 18, which in a non-limiting embodiment might be substantially conical, having a rounded tip 20 at one end. At its other end the affixation casing 14 is fitted with a radial flange 22. The flange 22 comprises a radially annular segment 24 and a conical segment 26. The annular segment 24 is connected by a relatively thin junction 28 to the associated end of the shell 18. Near the flange 22 the shell 18 comprises several peripherally distributed ribs or bosses 30 constituting an shoulder 32. A conical surface 34 is constituted above the shoulder 32 and a cylindrical surface 36a is constituted above the conical surface 34 and directly underneath the flange 22.

The casing 18 comprises a longitudinal, cylindrical cavity 36 which closes at the tip 20 while being open in the direction of the flange 22. An annular boss 38 is constituted on the wall of the cavity 36 and is approximately cross-sectionally trapezoidal.

The plug 16 comprises a head 40 of which the underside is fitted with a radial surface 42. The head is used to mount an arbitrary component which is omitted from the drawings. Underneath the radial surface 42, the plug 16 comprises a cylindrical segment 44. Below the cylindrical segment 44, the plug 16 comprises a longitudinal constriction 46. The constriction 46, the plug 16 exhibits a segment 48 of larger diameter fitted with an annular groove 50. The cross-section of the annular groove 50 is approximately complementary to the annular cross-section of the annular boss or rib 38. The plug end underneath the annular groove 51 is spherical.

Be it further borne in mind that, above the annular boss 38, the cavity 36 also is cylindrical, the diameter of this cavity segment being somewhat less than that of the cylindrical segment 44 of the plug 16.

FIG. 1 shows the pre-mounted state of affixation casing 14 and plug 16. The plug has been inserted into the cavity 36 and the annular boss 38 enters the groove 50, as a result of which the plug is retained in the cavity 36. The cylindrical segment 44 is situated outside the cavity 36 of the affixation casing 14.

The affixation casing 14 together with the plug 16 is forced into the aperture 12. In the process, the shell or hollow shank 18 was slightly deformed radially in the zone of the ribs 30 or the like, allowing the shell to slide through the aperture 12, whereupon the conical surface 34 engages the lower rim of the said aperture. The conical flange segment 26 rests in prestressed manner on the side of the sheetmetal 10 facing it. If the fastener shown in FIGS. 1 and 2 is forced through the said aperture, this procedure may be implemented by means of the plug 16 or its head 40. The force required to insert the affixation casing 14 is less than the force required to extract the plug 16 out of the position shown in FIGS. 1 and 2.

After the affixation casing 14 has been inserted, as shown in FIG. 2, the plug 16 will be pressed into it. The cylindrical segment 44 then cooperates with the cylindrical segment of the cavity 36 and slightly expands the shell 18 in this zone, as a result of which the shell 18 is securely held henceforth in the aperture 12 of the sheetmetal 10 and no longer can be pulled out again. The radial surface 42 rests against the top side of the flange segment 24 and further compresses the flange 22 against the sheetmetal, and as a result has implemented effective sealing. The shoulder 52 subtended by the constriction 46 of the plug 16 engages from underneath the annular boss 38, as a result of which the plug 16 in turn is reliably retained within the affixation casing 14. The rounded, or spherical in an embodiment, plug end 48 is dimensioned in a manner that it almost entirely fills the associated end of the cavity 36, as indicated in FIG. 3, the two plug zones on both sides of the groove 50 resting radially against the wall of the cavity 36.

Illustratively the sheetmetal 10 is an automotive body component and an omitted component is assumed to be affixed to the said sheetmetal. Moreover said component also may be configured between the flange 22 and said sheetmetal, between the head of the plug 16 and the flange 22 or only at the head of the plug 16. In every case, and as shown, the plug 16 is securely received in the casing 14.

The invention claimed is:

1. A fastener to affix a component in a support fitted with an aperture, comprising:
   an affixation casing of resilient plastic, further comprising a hollow conical shell defining a cylindrical cavity closed at a tip thereof, and a radial flange at a distant end thereof, the radial flange configured to cooperate in sealing manner with a rim of a support surface defining an aperture received by the casing, the casing being fitted peripherally with radial bosses configured to engage from below the aperture rim when the casing is inserted into said aperture, the cylindrical cavity having a annular inwardly point boss; and
   a plug comprising:
      a head, on an underside of which is fitted a radial surface;
      a cylindrical segment extending from a lower surface of the radial surface, the cylindrical segment having an outside diameter slightly larger than an inside diameter of the cylindrical cavity;
      a longitudinal constriction extending from a lower surface of the cylindrical segment, the longitudinal construction having a first segment near to the cylindrical segment and having a diameter less than a diameter of the cylindrical segment, and a second segment extending to a tip of the plug, the second segment having a diameter greater than the first segment, the second segment having an annular groove with a cross-section complementary to a cross-section of the annular inward pointing boss of the cylindrical cavity;
   wherein the annular boss of the cylindrical cavity is configured to engage the annular groove of the plug when the plug is fully inserted into the casing.

2. The fastener, as claimed in claim 1, wherein the annular boss consists of an annular rib.

3. The fastener, as claimed in claim 1, wherein the affixation casing and the plug are configured such that a force required to initially insert the plug into the affixation casing is less than a force required to completely force the plug into the affixation casing.

4. The fastener, as claimed in claim 1, wherein the segment of the plug between the annular groove and the cylindrical segment has a lesser diameter than the cylindrical segment.

5. The fastener, as claimed in claim 1, wherein the radial flange includes a radial annular segment and a conical segment, wherein the radial annular segment is connected to the conical shell by a thin junction, whereby once inserted, the radial surface of the plug rests against the top side of the annular segment of the flange, compressing the flange against the support surface.

* * * * *